United States Patent
Chiang et al.

(10) Patent No.: US 8,390,263 B2
(45) Date of Patent: Mar. 5, 2013

(54) SOFT-START CIRCUIT HAVING A RAMP-UP VOLTAGE AND METHOD THEREOF

(75) Inventors: Ming-Cheng Chiang, HsinChu (TW); Wei-Chou Wang, Taoyuan Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

(21) Appl. No.: 12/344,304

(22) Filed: Dec. 26, 2008

(65) Prior Publication Data

US 2009/0167276 A1    Jul. 2, 2009

(30) Foreign Application Priority Data

Dec. 27, 2007   (TW) ............................... 96150662 A

(51) Int. Cl.
*G05F 1/56* (2006.01)
*G05F 1/563* (2006.01)
*G05F 1/565* (2006.01)
(52) U.S. Cl. .................. 323/288; 323/284; 323/285
(58) Field of Classification Search .................. 323/282, 323/284, 285, 288, 901; 363/49
See application file for complete search history.

(56) References Cited

U.S. PATENT DOCUMENTS

| | | | |
|---|---|---|---|
| 6,046,577 A * | 4/2000 | Rincon-Mora et al. | 323/282 |
| 6,348,833 B1 | 2/2002 | Tsujimoto et al. | |
| 7,170,352 B1 * | 1/2007 | Caldwell | 330/261 |
| 7,248,026 B2 * | 7/2007 | Ritter | 323/281 |
| 2005/0007167 A1 * | 1/2005 | Tange | 327/172 |

* cited by examiner

*Primary Examiner* — Adolf Berhane
*Assistant Examiner* — Nusrat Quddus
(74) *Attorney, Agent, or Firm* — McClure, Qualey & Rodack, LLP

(57) ABSTRACT

A soft-start circuit and a method thereof are described. The circuit includes an amplifier and a voltage ramp generator. The amplifier has a first input end, a second input end, an output end, and a power source control end. The first input end is coupled to a reference voltage. The second input end is coupled to a feedback voltage. The output end outputs an output voltage, and the feedback voltage corresponds to the output voltage. The voltage ramp generator is coupled to the power source control end, and generates a ramp-up voltage. When the ramp-up voltage is lower than a threshold value, the output voltage rises with the ramp-up voltage. When the ramp-up voltage is not lower than the threshold voltage, the output voltage remains at a stable value. A surge current occurring during smooth soft-start or even in operation is thus prevented.

16 Claims, 8 Drawing Sheets

SOFT-START CIRCUIT HAVING A RAMP-UP VOLTAGE AND METHOD THEREOF

CROSS-REFERENCES TO RELATED APPLICATIONS

This non-provisional application claims priority under 35 U.S.C. §119(a) on Patent Application No(s). 96150662 filed in Taiwan, R.O.C. on 2007/12/27, the entire contents of which are hereby incorporated by reference.

BACKGROUND OF THE INVENTION

1. Field of Invention

The present invention relates to a soft-start circuit and a method thereof, and more particularly to a circuit capable of ensuring a smooth soft-start and preventing surge current during operation, and a method thereof.

2. Related Art

A switching regulator having a high voltage conversion efficiency is often used to convert a current with a significant voltage difference and large load. However, an excessive rush current or overshoot of output voltage often occurs soon after the switching regulator is powered on, and results in damage to the circuit. Therefore, when the switching regulator is powered on, a soft-start device is required to make the supply voltage rise slowly. In addition to the switching regulator, the soft-start device can be applied to many other circuits, as long as these circuits require the input voltage to rise slowly to avoid excessive rush current or overshoot of output voltage being generated soon after they are powered on.

FIG. 1A is a schematic view of a soft-start device in the prior art. Referring to FIG. 1A, the soft-start device in the prior art includes a current source A10, a capacitor A20, a switch A30, a reference voltage A40, and a fixed voltage source A50.

The soft-start device is an open loop operation at first, that is, the switch A30 is open. The current source A10 charges the capacitor A20. During the charging process, the voltage of the capacitor A20 rises slowly to generate a ramp voltage. The reference voltage A40 rises slowly with the ramp voltage, so as to ensure a soft-start. At this time, while the ramp voltage is close to the voltage of the fixed voltage source A50 (which may be a bandgap voltage), the soft-start mechanism must finish in order for the system to resume normal operation. In detail, the switch A30 is closed and returned to a closed loop, such that the reference voltage A40 outputs the voltage of the fixed voltage source A50.

However, the time point at which to switch the switch A30 is difficult to control, so a discontinuous surge often occurs, making the system unstable and causing errors. FIG. 1B is a schematic waveform diagram (I) of the soft-start device in the prior art. As shown in FIG. 1B, if the switch A30 is switched too late, the reference voltage (Vref) A40 may exceed the bandgap voltage (Vbg), and form an upward surge before returning to the bandgap voltage Vbg. FIG. 1C is a schematic waveform diagram (II) of the soft-start device in the prior art. As shown in FIG. 1C, if the switch A30 is switched too early, the reference voltage Vref A40 may not reach the bandgap voltage Vbg, so that a gap exists between the reference voltage A40 and the bandgap voltage.

Therefore, the problems in the prior art (derived from the discontinuous voltage waveform when the switch of the soft-start device is turned on/off, or derived from the current surge during the operation of the switching regulator), must be solved.

SUMMARY OF THE INVENTION

The objective of the present invention is utilized to solve the aforementioned problems.

Accordingly, the present invention is directed to a soft-start circuit and a method thereof. After a soft-start mechanism ends, the present invention converts smoothly the soft-start mechanism to normal operation mechanism without causing any surge, so as to ensure a smoother soft-start function and also avoid a surge current being generated during operation.

A soft-start circuit including an amplifier and a voltage ramp generator is provided. The amplifier includes a first input end, a second input end, an output end, and a power source control end. The first input end is coupled to a reference voltage. The second input end is coupled to a feedback voltage. The output end outputs an output voltage, and the feedback voltage corresponds to the output voltage. The voltage ramp generator is coupled to the power source control end, and generates a ramp-up voltage. When the ramp-up voltage is lower than a threshold value, the output voltage rises with the ramp-up voltage. When the ramp-up voltage is not lower than the threshold value, the output voltage remains at a stable value.

A soft-start method is also provided. The method includes the steps of: providing an amplifier including a first input end, a second input end, an output end, and a power source control end, wherein the first input end is coupled to a reference voltage, the second input end is coupled to a feedback voltage, the output end outputs the output voltage, and the feedback voltage corresponds to the output voltage; and inputting a ramp-up voltage to the power source control end. The output voltage and the feedback voltage rise with the ramp-up voltage, and when the feedback voltage reaches the reference voltage the output voltage remains at a stable value.

Preferred embodiments of the present invention and the effects thereof are described below with reference to the accompanying drawings.

BRIEF DESCRIPTION OF THE DRAWINGS

The present invention will become more fully understood from the detailed description given below for illustration only, which is thus not limitative of the present invention, and wherein.

DETAILED DESCRIPTION OF THE INVENTION

Figure 1A:
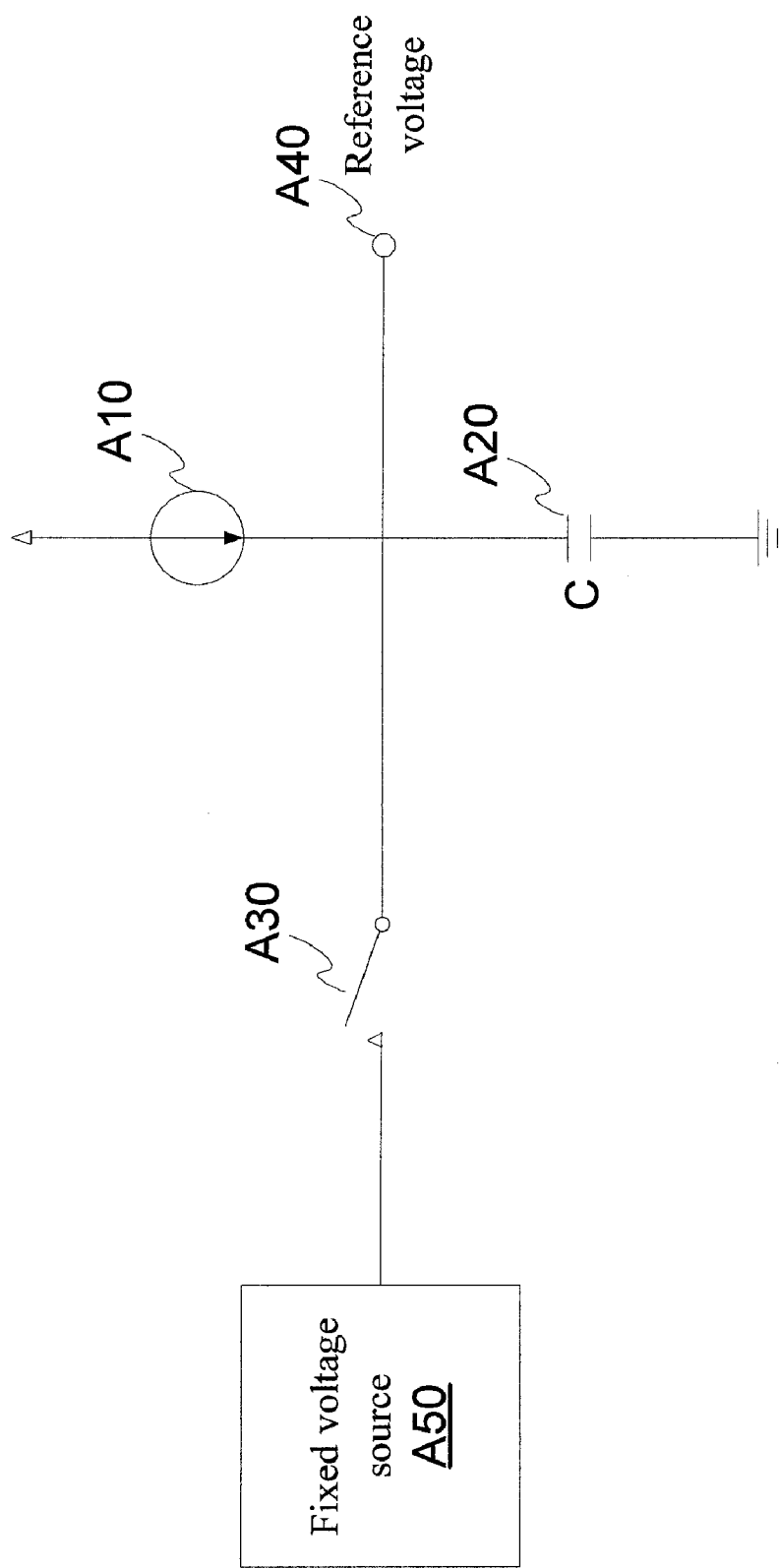
FIG. 1A is a schematic view of a soft-start circuit in the prior art.
Figure 1B:
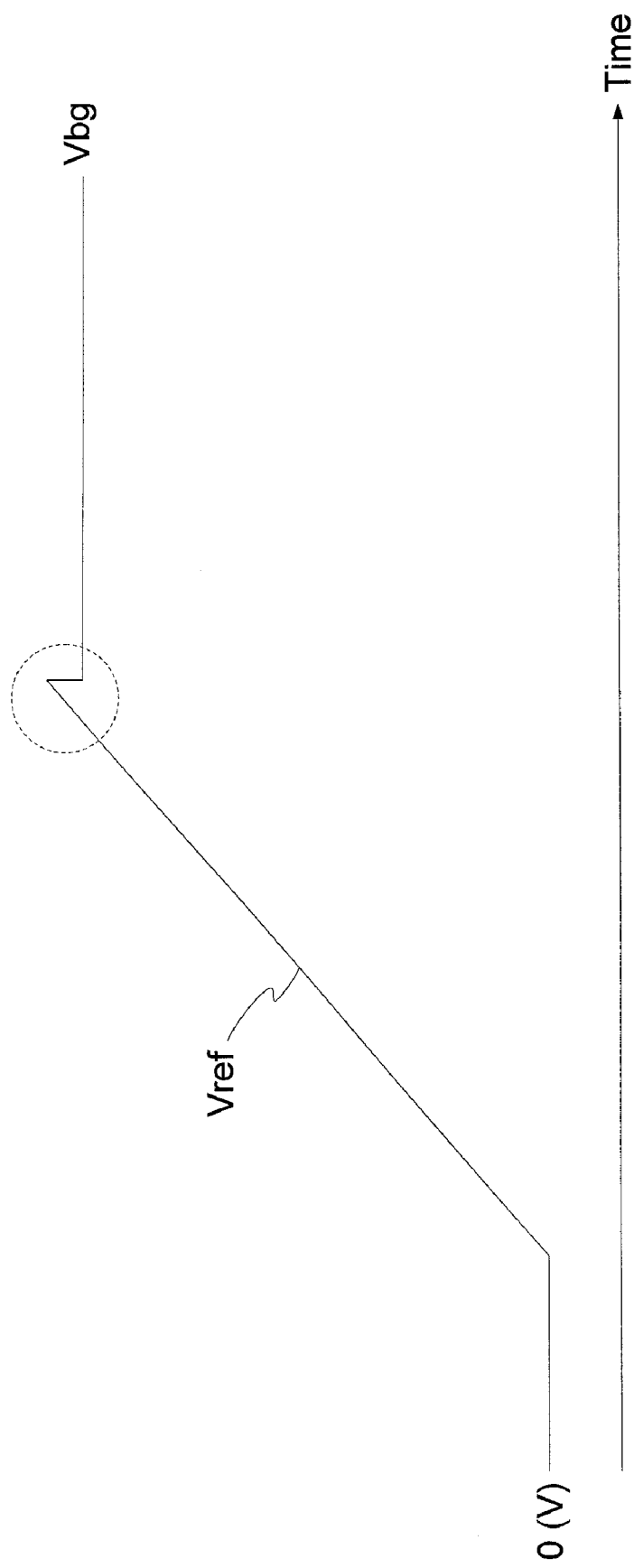
FIG. 1B is a schematic waveform diagram (I) of the soft-start circuit in the prior art.
Figure 1C:
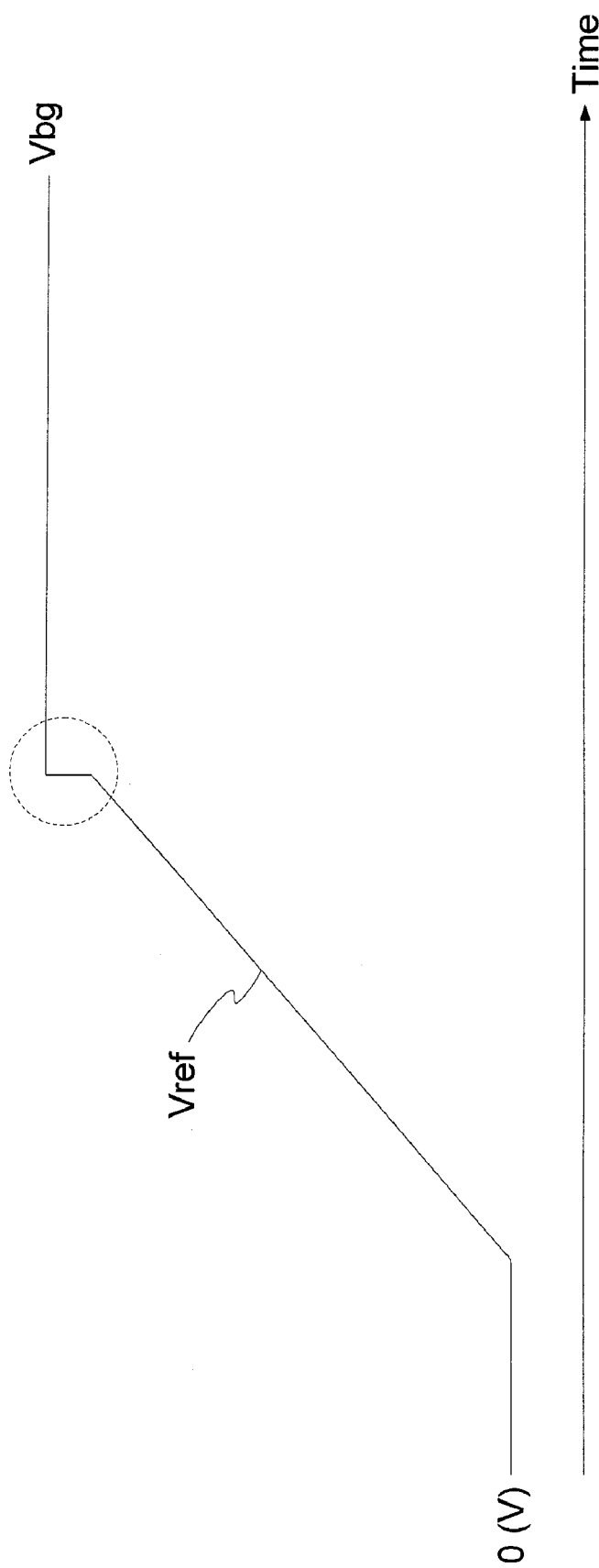
FIG. 1C is a schematic waveform diagram (II) of the soft-start circuit in the prior art.
Figure 2:
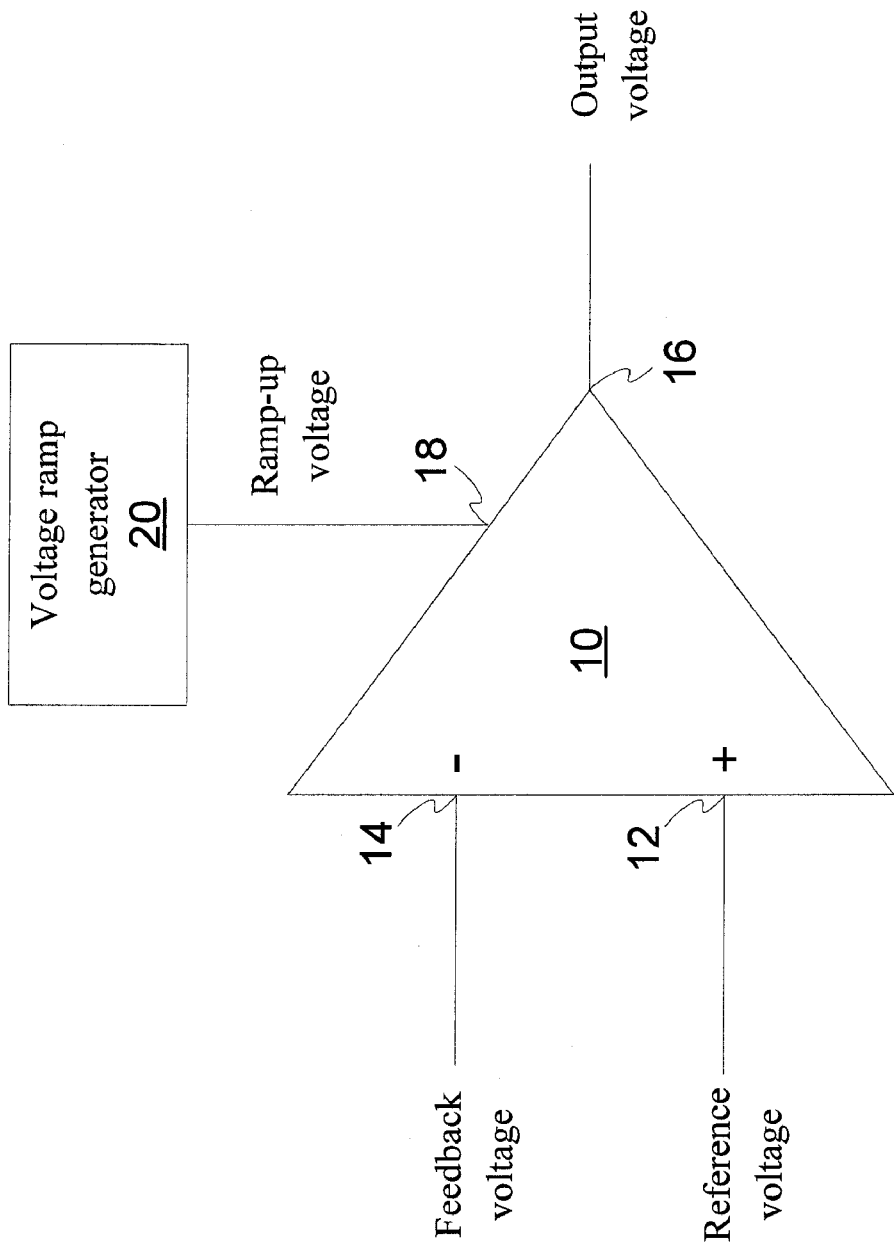
FIG. 2 is a schematic view of a soft-start circuit according to an embodiment of the present invention.

FIG. 2 is a schematic view of a soft-start circuit according to a first embodiment of the present invention. The soft-start circuit includes an amplifier 10 and a voltage ramp generator 20.

The amplifier 10 includes a positive input end 12, a negative input end 14, an output end 16, and a power source control end 18, wherein the positive input end 12 also called first input end and the negative input end 14 also called second input end. The positive input end 12 is coupled to a reference voltage. The output end 16 outputs an output voltage and generates a feedback voltage according to the output voltage, and the feedback voltage is coupled to the negative input end 14. Here, the reference voltage may be a bandgap voltage.

The voltage ramp generator 20 is coupled to the power source control end 18 of the amplifier 10 to generate a ramp-up voltage. Here, the ramp-up voltage is a ramp voltage, and the value thereof rises from zero to a supply voltage Vdd.

Here, the output voltage output from the amplifier 10 changes with the ramp-up voltage generated by the voltage ramp generator 20. The relationship between the two voltages is as follows. When the ramp-up voltage is lower than a threshold value, the output voltage rises with the ramp-up voltage. When the ramp-up voltage is not lower than the threshold value, i.e., the ramp-up voltage is greater than or equal to the threshold value, the output voltage will not rise with the ramp-up voltage, but remain at a stable value.

Figure 3:
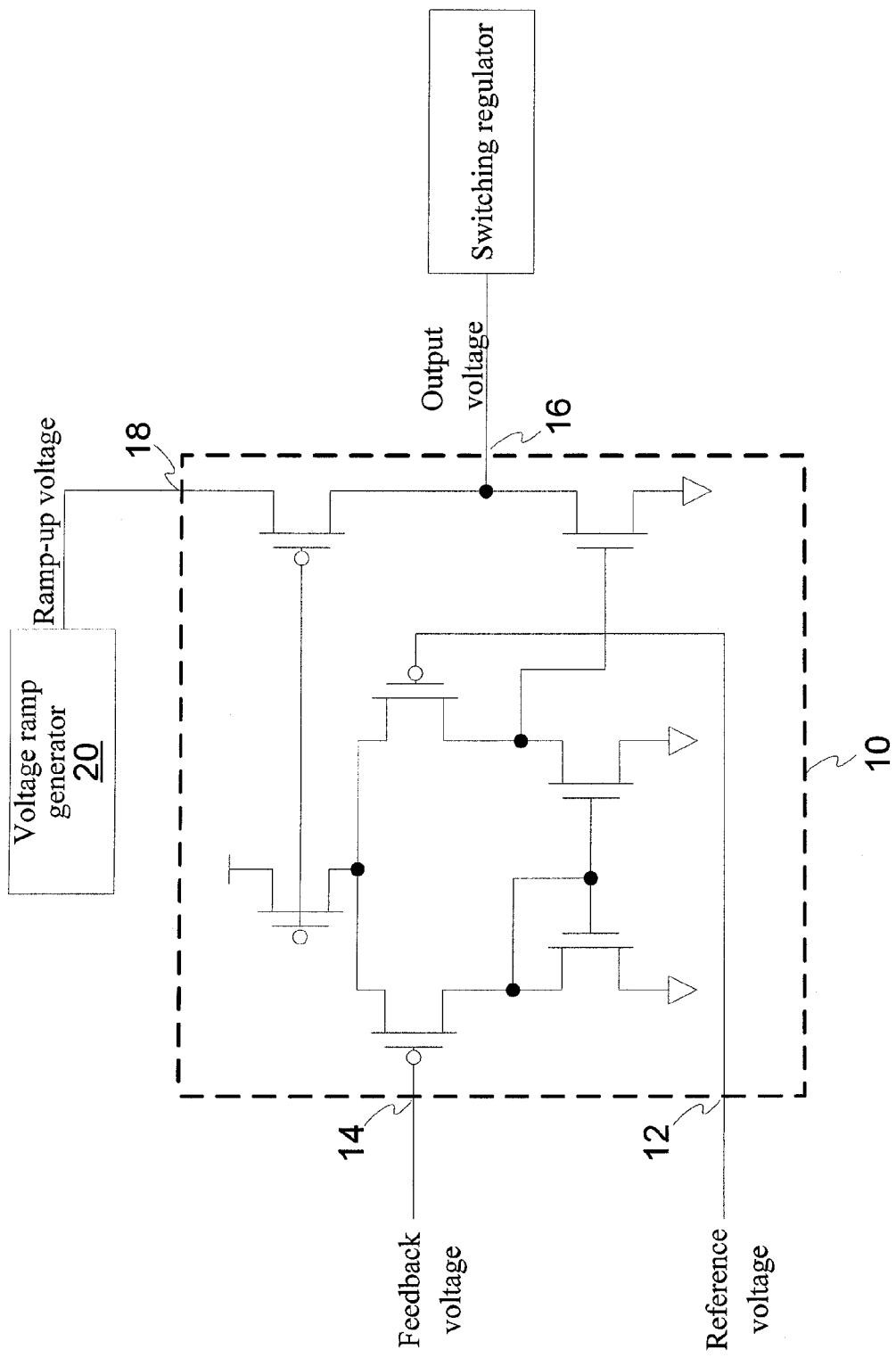
FIG. 3 is a schematic view of a soft-start circuit according to an embodiment of the present invention.

A switching regulator employing the soft-start circuit is taken as an example for illustration below. FIG. 3 is a schematic view of a soft-start circuit according to a second embodiment of the present invention. In the second embodiment, the amplifier 10 is an error amplifier. In FIG. 3, the output voltage from the output end 16 of the amplifier 10 is provided to the switching regulator for later use.

As described earlier, the feedback voltage is generated according to the output voltage, and the values of the two voltages are not necessarily the same, but will change correspondingly. The output voltage rises with the ramp-up voltage soon after the ramp-up voltage is initiated (i.e., the ramp-up voltage is lower than the threshold value), so the feedback voltage also rises with the ramp-up voltage. The feedback voltage rises with the ramp-up voltage and approaches the reference voltage. When the feedback voltage rises to the reference voltage (i.e., reaching the threshold value), the output voltage stops rising with the ramp-up voltage and remains at a stable value. Therefore, the threshold value is the ramp-up voltage when the feedback voltage is equal to the reference voltage.

In this embodiment the ramp-up voltage is generated by the voltage ramp generator 20, and is provided to the power source control end 18 of the amplifier 10. Here, the reference voltage input from the positive input end 12 of the amplifier 10 does not need to increase slowly, but may rise to a fixed voltage (i.e., a bandgap voltage), soon after the reference voltage is input.

In addition, the power source control end 18 of the amplifier 10 is at an output stage of the amplifier 10. That is, in the present invention the power at the output stage of the amplifier 10 is controlled to adjust the output voltage of the amplifier 10, so as to prevent a surge. According to the present invention, after the soft-start mechanism ends (that is, when the ramp-up voltage reaches the threshold value), the output voltage remains at a stable value so as to convert smoothly the soft-start mechanism to normal operation. The surge may not occur during this conversion thus realizing a smoother conversion process.

Figure 4:
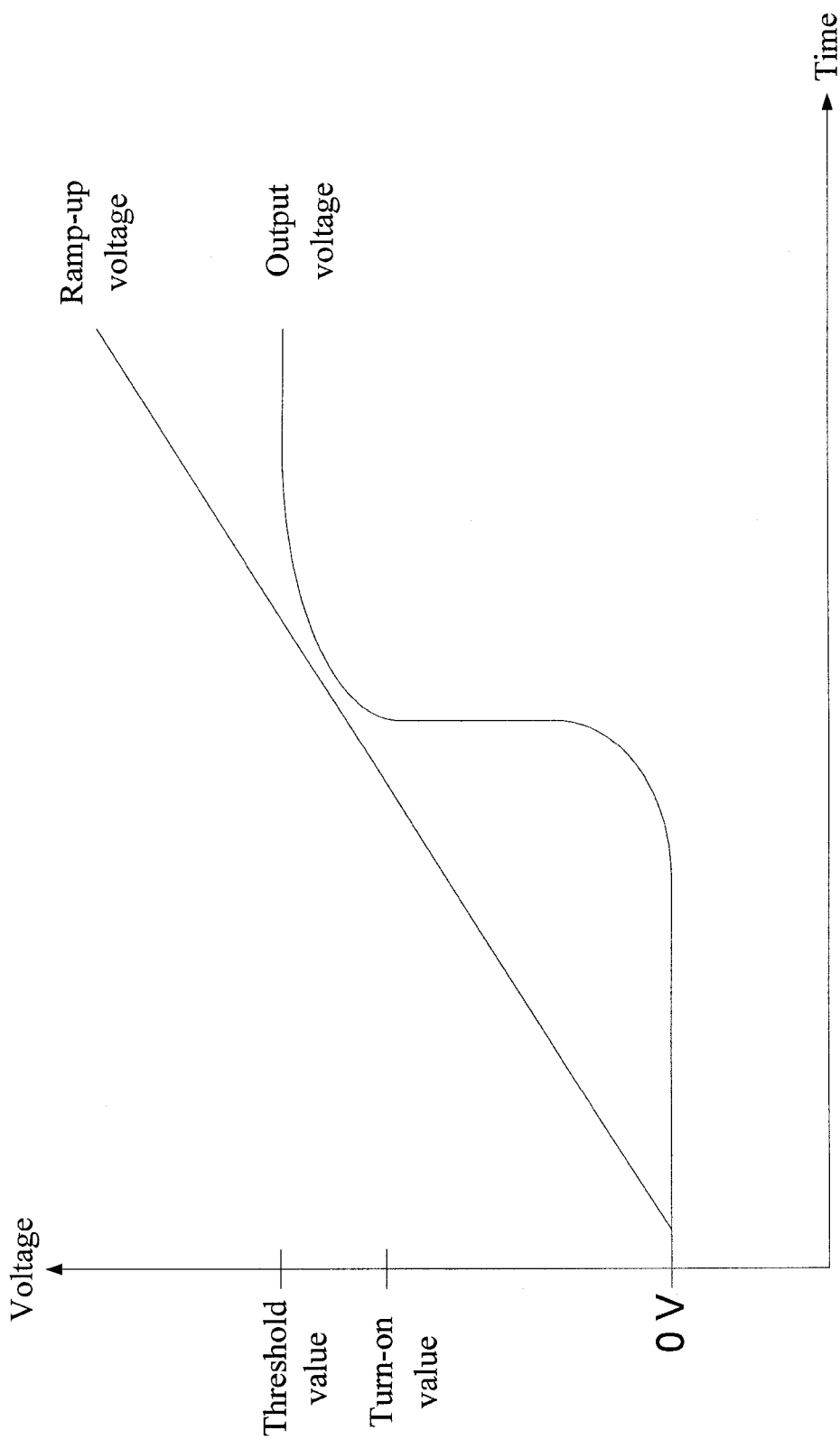
FIG. 4 is a schematic waveform diagram of a soft-start circuit according to an embodiment of the present invention.

FIG. 4 is a schematic waveform diagram of a soft-start circuit of the present invention. As shown in FIG. 4, when the ramp-up voltage rises slowly from zero but still below the threshold value, the output voltage also rises with the ramp-up voltage. As seen in FIG. 4, when the ramp-up voltage starts to rise the output voltage almost does not increase but remains at zero as a MOS switch (as shown in FIG. 3) of the amplifier 10 is not turned on, and thus the output voltage does not respond. When the ramp-up voltage rises to the ON voltage (i.e., the turn-on value in FIG. 4), of the MOS switch the MOS switch enters saturation region, and the output voltage of the amplifier 10 will rise with the ramp-up voltage.

Referring to FIG. 4, when the ramp-up voltage rises to the threshold value the output voltage stops rising with the ramp-up voltage, and remains at a stable value. At this time the soft-start circuit shifts to normal operation to output the final stable voltage. Moreover, as shown in FIG. 4, the output voltage is constantly lower than the ramp-up voltage. Therefore, the output voltage of the amplifier 10 can be limited by controlling the power (ramp-up voltage), at the output stage of the amplifier 10.

Figure 5:
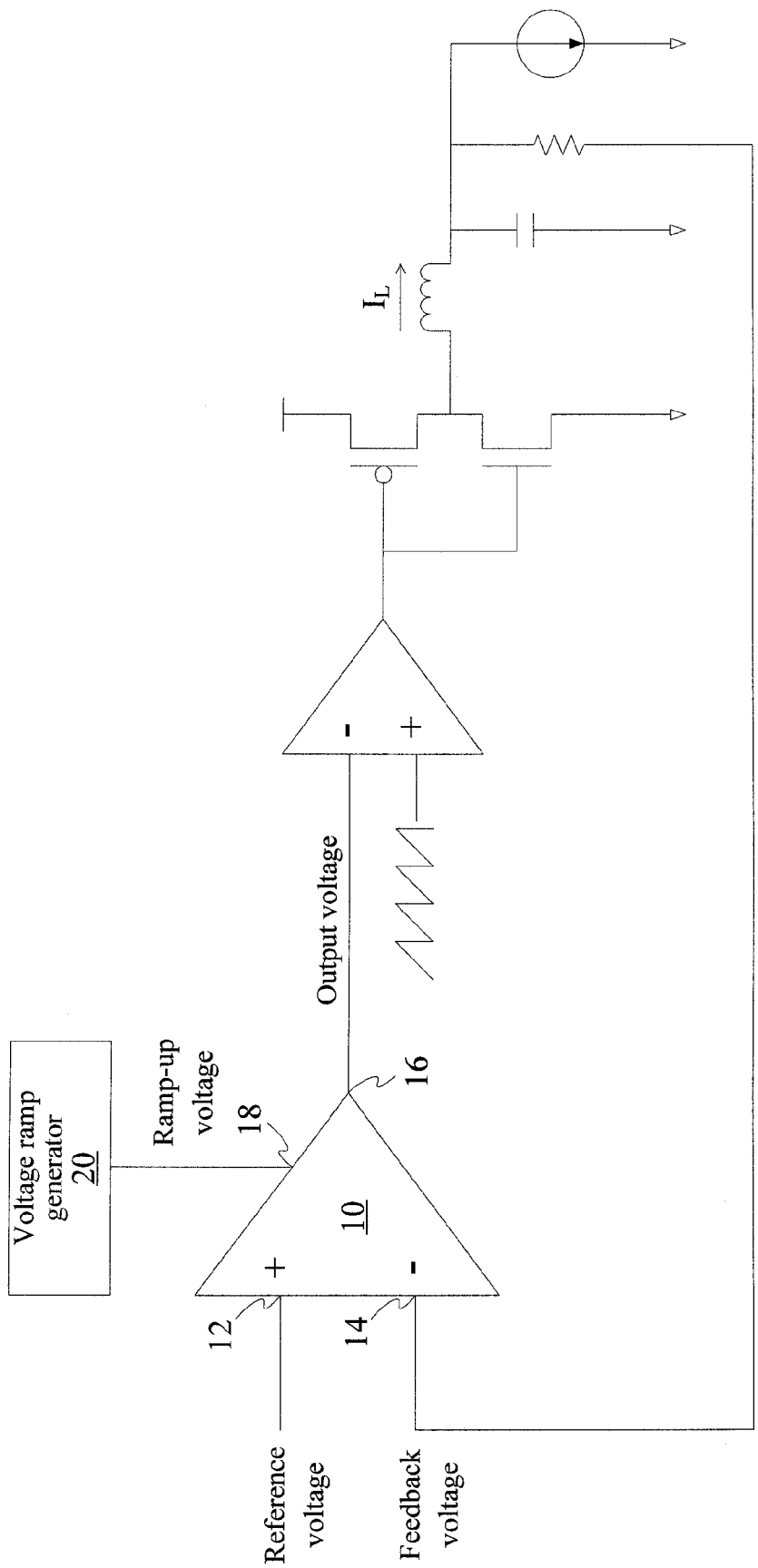
FIG. 5 is a schematic view of a soft-start circuit according to an embodiment of the present invention.

FIG. 5 shows a soft-start circuit applied in normal operation according to an embodiment of the present invention. In normal operation, as the output voltage is not higher than the ramp-up voltage, the ramp-up voltage can be used to control the upper limit of the output voltage. Taking the switching regulator as an example, the maximum duty of the switching regulator is determined by the ramp-up voltage, so as to prevent a possible surge current (exceeding the normal range of the current $I_L$), caused by the sudden increase of the output voltage due to external influences. The integrated circuit is thus protected. Therefore, in addition to the surge prevention mechanism, the soft-start circuit of this embodiment may also be used as a circuit for limiting the maximum duty in normal operation to prevent surge currents.

Figure 6:
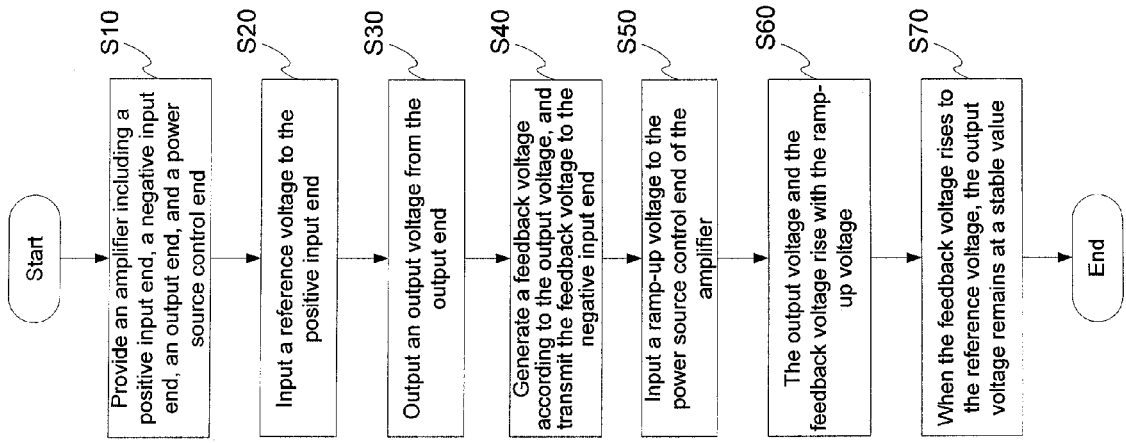
FIG. 6 is a flow chart of a soft-start method according to the present invention.

FIG. 6 is a flow chart of a soft-start method. The method includes the following steps.

Step S10: Provide an amplifier including a positive input end, a negative input end, an output end, and a power source control end. Here, the amplifier may be an error amplifier.

Step S20: Input a reference voltage to the positive input end. Here, the reference voltage may be a bandgap voltage.

Step S30: Output an output voltage from the output end.

Step S40: Generate a feedback voltage according to the output voltage, and transmit the feedback voltage to the negative input end.

Step S50: Input a ramp-up voltage to the power source control end of the amplifier. Here, the ramp-up voltage may rise from zero to a supply voltage (Vdd). The power source control end is at an output stage of the amplifier.

Step S60: The output voltage and the feedback voltage rise with the ramp-up voltage.

Step S70. When the feedback voltage rises to the reference voltage, the output voltage remains at a stable value. Here, the output voltage is constantly lower than the ramp-up voltage.

Though the content of the present invention has been disclosed above by the preferred embodiments, they are not intended to limit the present invention. Anybody skilled in the art can make some modifications and variations without departing from the spirit and scope of the present invention. Therefore, the protecting range of the present invention falls within the appended claims.

What is claimed is:

1. A soft-start circuit, comprising:
    an amplifier, comprising a non-inverting input an inverting input, an output, and a power source control input, wherein the non-inverting input is coupled to a reference voltage, the inverting input is connected to the output to feedback an output voltage as a feedback voltage to the inverting input; and
    a voltage ramp generator, coupled to the power source control input for generating a ramp-up voltage, wherein the power source control input is at an output stage of the amplifier, wherein when the ramp-up voltage is lower than a threshold value, the output voltage rises with the ramp-up voltage, and when the ramp-up voltage is not lower than the threshold voltage, the output voltage is substantially at a stable value.

2. The circuit according to claim 1, wherein the feedback voltage rises with the ramp-up voltage.

3. The circuit according to claim 2, wherein when the feedback voltage is equal to the reference voltage, the threshold value is the ramp-up voltage.

4. The circuit according to claim 1, wherein the ramp-up voltage rises from zero to a supply voltage.

5. The circuit according to claim 1, wherein the amplifier is an error amplifier.

6. The circuit according to claim 1, wherein the reference voltage is a bandgap voltage.

7. The circuit according to claim 1, wherein the output voltage is constantly lower than the ramp-up voltage.

8. The circuit according to claim 1, further comprising means for converting smoothly a soft-start mode to a normal mode after the soft-start mode ends.

9. The circuit according to claim 1, wherein the output voltage of the amplifier is controlled by controlling the ramp-up voltage.

10. A soft-start method, comprising:
providing an amplifier comprising a non-inverting input end, an inverting input, an output, and a power source control input, wherein the non-inverting input is coupled to a reference voltage, the inverting input is connected to the output to feedback an output voltage as a feedback voltage to the inverting input; and
inputting a ramp-up voltage to the power source control input, wherein the power source control input is at an output stage of the amplifier,
wherein the output voltage and the feedback voltage rise with the ramp-up voltage, and when the feedback voltage increases to the reference voltage, the output voltage is at a stable value.

11. The method according to claim 10, wherein the ramp-up voltage rises from zero to a supply voltage.

12. The method according to claim 10, wherein the amplifier is an error amplifier.

13. The method according to claim 10, wherein the reference voltage is a bandgap voltage.

14. The method according to claim 10, wherein the output voltage is constantly lower than the ramp-up voltage.

15. The method according to claim 10, further comprising means for smoothly converting a soft-start mode to a normal mode after the soft-start mode ends.

16. The method according to claim 10, adapted for limiting a maximum duty during normal mode.

* * * * *